June 20, 1950  M. H. BARNES  2,511,962
FORMING JEWEL BEARING BLANKS
Filed July 17, 1946
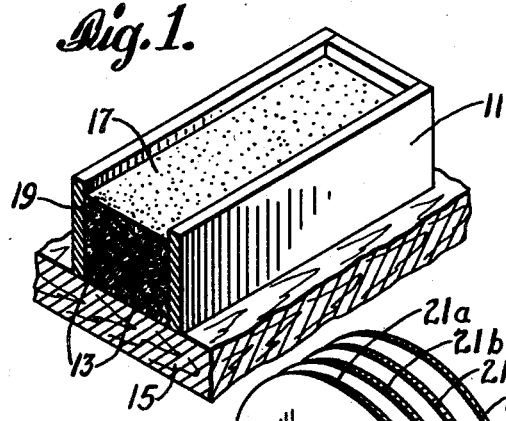
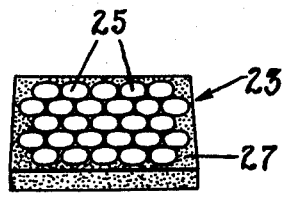
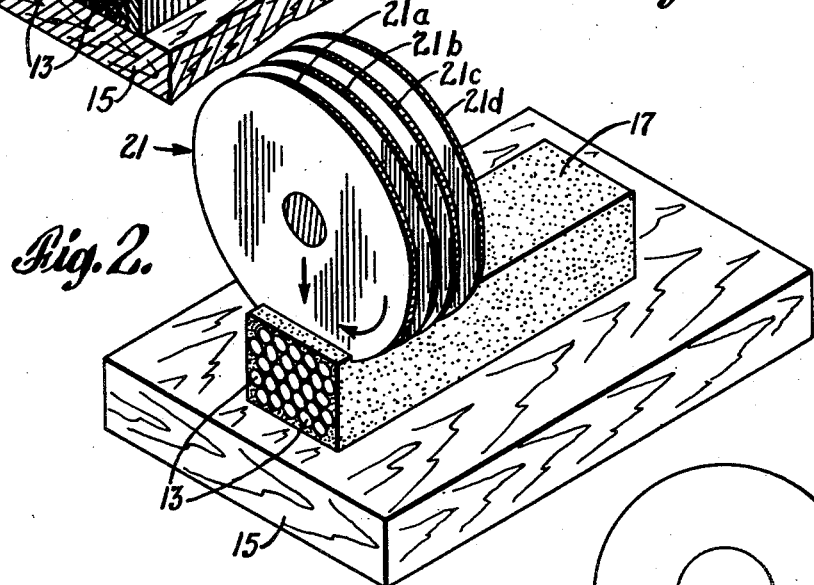
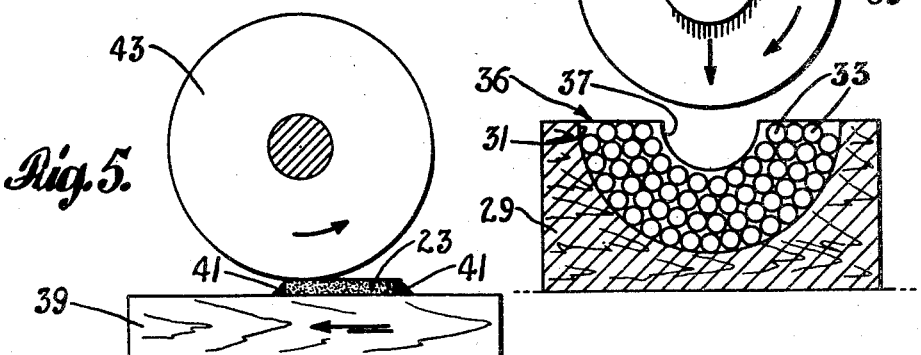
INVENTOR
MALCOLM H. BARNES
BY
ATTORNEY Patented June 20, 1950

2,511,962

UNITED STATES PATENT OFFICE 2,511,962

FORMING JEWEL BEARING BLANKS

Malcolm H. Barnes, Kenmore, N. Y., assignor to The Linde Air Products Company, a corporation of Ohio Application July 17, 1946, Serial No. 684,124

6 Claims. (Cl. 51—283)

This invention relates to a novel method for cutting long thin rods of hard material, such as synthetic corundum and spinel, into slices for the manufacture of jewel bearings, and to the processing of such slices after cutting.

Although spinel rods sometimes may have slightly flat sides, the slices cut therefrom are for simplicity called roundels, just as are the true roundels cut from cylindrical corundum rods.

In the art of manufacturing jewel bearings a large proportion of the cost can be attributed to the time and labor required for individually handling the many tiny roundels or blanks from which the bearings are made. Also, there has always been an appreciable loss of material due to chipping of the hard bearing material when cut into roundels.

Among the objects of this invention are to lower the cost of producing jewel bearings by reducing individual handling of tiny blanks; to improve the yield of unchipped roundels in the cutting operation; and to cut a maximum number of roundels during each stroke of a saw blade.

In the drawing,

Fig. 1 is a cross sectional view showing a plurality of long thin rods of corundum or like hard material arranged in a compact bundle in a mold filled with a binding material;

Fig. 2 is a schematic perspective view showing the cutting of roundels by the method of the invention;

Fig. 3 is a perspective view showing the product obtained when cutting roundels by the novel method;

Fig. 4 is a cross sectional view through another bundle of rods bound together in a mold and showing an alternative arrangement of rods; and Fig. 5 is a schematic perspective view showing how the roundels are processed after cutting.

In accordance with this invention there is provided a method for cutting roundels from long thin rods of hard bearing material, such as synthetic corundum and spinel rods, by cutting a compact integrated bundle of such rods 13 bound tightly together in parallel relation to one another with a suitable binding material distributed between adjoining rods so that each rod is bound to its neighbors the full length thereof.

One suitable binding material is jeweler's wax, which is melted and poured into a mold 11. Then the desired number of loose rods 13 is immersed below the surface of the confined pool of fluid jeweler's wax in a group comprising multiple layers each comprising a plurality of rods, the rods of each successive layer being arranged so as to nest between the rods of the preceding layer to provide a compact bundle, and the wax is allowed to cool and solidify. Upon removing the side walls and the end walls from the mold 11 there is left adhering to the board 15 which formed the bottom of the mold a compact integrated multilayered bundle 17 wherein the rods 13 are all bound firmly to one another from end to end by the matrix 19 of jeweler's wax which uniformly coats each rod, fills the spaces between neighboring rods, and forms a layer or skin around the outside of the bundle.

The bundle 17 on board 15 is then positioned at a cutting locality under a rotating gang saw 21 comprising a group of parallel spaced saw blades 21a, b, c, and d. Upon advancing the saw down through the bundle 17 transversely of the rods 13 a plurality of thin slices are cut off, such as the slice 23 (see Fig. 3) comprising a plurality of thin roundels 25 embedded firmly in a matrix 27 of binding material and having exposed cut surfaces free from binder on opposite sides of the slice. Saw blades 21a, b, c, and d are conventional copper discs having cutting edges impregnated with diamond particles. Cutting also can be done with a single rotating saw blade which can be repeatedly advanced through the bundle 17 to cut a plurality of thin slices or plates successively.

In the modification shown in Fig. 4, the jeweler's wax was poured into a wooden mold 29 with a semi cylindrical cavity 31 having a diameter slightly less than a saw 32, and loose rods 33 were piled in the liquid wax parallel to one another in multiple layers to a depth slightly less than the radius of the saw blade 32 minus the radius of the blade-supporting flange 35. Then a cylindrical core (not shown) having a diameter slightly greater than the outside diameter of the flange 35 was placed on top of the piled rods concentrically with the cavity 31, and more rods were piled in the liquid wax to fill up the space between the core and the wall of the cavity to the level of the center of curvature of the cavity. Upon removing the core and the ends of the mold 29 after the wax solidified there was left concentrically in a semi cylindrical integrated bundle of rods a semi cylindrical cavity 37 of slightly greater diameter than flange 35 to receive the flange when the saw is advanced down through the bundle to cut a thin slice. With this arrangement more rods can be cut with each stroke of the saw blade than when the rods are piled to a uniform depth, because the flange 35 of the saw blade enters the cavity 37 near the end of its downward stroke. Each semicircular plate or slice obtained by cutting the bundle 36 can be processed further while the roundels are still bound together with their flat surfaces arranged in a common plane on each side of the plate.

The foregoing description relates specifically to vertical plunge cutting wherein the center of the saw blade traverses a path directed through the bundle. However, the principles of the invention also apply to other cutting procedures such as horizontal cutting, and off-center cutting (wherein the center of the saw blade traverses a path directed to one side of the bundle).

A relatively high yield of unchipped roundels is obtained in sawing a bundle of rods by the method described above because the binder takes the load of cutting. When cutting rods individually, the roundels tend to chip more easily during cutting.

For a good yield of usable jewel blanks in cutting unicrystalline corundum rods by the described method, rods should be selected wherein the optic orientation is between 30° and 80°, and preferably between 40° and 80°. Relatively poor yields are obtained outside of these ranges because the rods tend to crack and split during sawing. The measure of optic orientation is the angle between the longitudinal axis of a corundum rod and its optic or C-axis. The roundels, of course, have the same optic orientations as the corundum rods from which they were cut.

The yield of usable roundels cut from synthetic corundum rods can be increased by mounting each rod in such a position that, of the total force applied by the saw to the rod, the force component parallel to the C-axis of the rod is approximately the minimum possible at any position of the rod with respect to the cutting device (ideally zero). In general, it can be stated that the force component parallel to the C-axis should not exceed 40% of the total force applied by the saw summed vectorially. As a practical matter, the rods should all be positioned so that the normal to the plane defined by the C-axis and the longitudinal axis of the rod makes an angle between 0° and 30° with the direction of progression of the cut through the rod. My Patent No. 2,487,091 discusses this in greater detail.

After a slice or plate 23 has been cut from a bundle at the cutting locality, it can be transferred bodily to another locality and the individual roundels 25 can be inspected and further processed while still embedded firmly in the matrix 27 filling the spaces between adjoining roundels, thus avoiding individual handling of the tiny roundels and reducing the manufacturing cost. For example, the plate 23 can be mounted flat on a wood bed 39 with jeweler's wax 41 or other suitable adhesive. Then the bed 39 is positioned adjacent to a rotating diamond-impregnated cylindrical copper grinding wheel 43 which has a face wide enough to span the plate 23, and the upper exposed coplanar cut surfaces of the roundels are ground smooth and flat by the wheel while the roundels are still bound together. Upon completion of the grinding operation the plate 23 can be detached from the bed 39, turned over and refastened to the bed, and then the other exposed cut surfaces of the roundels can be similarly ground swooth, flat, and parallel to the initially ground surfaces. The group of roundels, with ground parallel surfaces at their opposite ends, may then be separated from the matrix and from one another for further processing if desired, by removing the binding material, as by melting out the jeweler's wax. However, when further processing of the roundels is to be done at another locality, it is easier to package and ship the composite plates than to separate the roundels before shipment.

Besides jeweler's wax, suitable binding materials for binding the rods and roundels together are glue, plaster of Paris, polyethylene, Wood's metal, a mixture of 80% sodium carbonate and 20% borax, and Du Pont Household Cement. The binder should have the property of wetting the rod when fluid so that there will be no air gaps between adjacent rods when the binder solidifies; and no rod-to-rod contact.

The roundels 25 adhere together most firmly during the grinding or other subsequent operations if the binder is an adhesive material which actually sticks to the rods, such as shellac, jeweler's wax, or glue.

Specific embodiments of the method and products of the invention have been described herein by way of example only, solely to illustrate the principles of the invention. It is to be understood that modifications of the invention can be made within the scope of the claims.

What is claimed is:

1. A method for forming roundels from long thin rods of hard material, which comprises grouping a plurality of such rods together in parallel relation to one another; binding said rods together with a suitable binding material distributed between adjoining rods from end to end thereof so that each rod is bound to its neighbors the full length thereof to form an integrated bundle; cutting a thin slice from said integrated bundle transversely of said rods, said slice comprising a plurality of thin roundels embedded firmly in a matrix of said binding material; transferring said slice bodily to another locality and further processing said roundels at said locality while they are bound together in said slice.

2. A method for forming roundels from long thin rods of hard material, which comprises grouping a plurality of such rods together in parallel relation to one another; binding said rods together with a suitable binding material distributed between adjoining rods from end to end thereof so that each rod is bound to its neighbors to form an integrated bundle; cutting a thin slice from said integrated bundle transversely of said rods at a cutting locality, said slice comprising a plurality of thin roundels embedded firmly in a matrix of said binding material and having exposed cut surfaces on both sides of the slice; transferring said slice bodily to a grinding locality; grinding the cut surfaces of said roundels smooth and flat on one side of said slice while they are bound together; and grinding the cut surfaces of said bound roundels on the opposite side of said slice smooth, flat, and parallel to the surfaces on said first mentioned side.

3. A method for cutting roundels from long thin rods of hard material, which comprises grouping a plurality of such rods together in parallel relation to one another in multiple layers comprising a plurality of rods; binding said rods together with a suitable low melting binding material distributed between adjoining rods from end to end thereof so that each rod is bound to its neighbors the full length thereof to form an integrated bundle; cutting a thin slice from said integrated bundle transversely of said rods, said slice comprising a plurality of thin roundels embedded firmly in a matrix of said binding material; and subsequently separating said roundels from said matrix by melting out said binding material.

4. A method for cutting roundels from long thin rods of hard material with a rotating disc saw having a support concentric therewith and of smaller diameter than said saw, said method comprising binding a plurality of such rods together in parallel relation to one another in a semi cylindrical bundle with a suitable binding material distributed between adjoining rods so that each rod is bound to its neighbors to form an integrated bundle, said bundle having a diameter smaller than said saw and having concentrically therein a semi cylindrical cavity of slightly greater diameter than said support; and cutting a thin slice from said integrated bundle by advancing said saw across said bundle in such a direction that said support enters said cavity, said slice comprising a plurality of thin roundels embedded firmly in a matrix of said binding material.

5. A method for cutting roundels from long thin rods of a hard material, which comprises forming a confined pool of low-melting binding material; then immersing a plurality of such rods in parallel relation to one another and in multiple layers below the surface of said pool to distribute such binding material between adjoining rods; solidifying such binding material to form an integrated bundle or rods embedded in a matrix of such binding material; and cutting a thin slice from said bundle transversely of said rods, said slice comprising a plurality of thin roundels embedded firmly in a matrix of said binding material.

6. A method for cutting roundels from long thin generally cylindrical rods of a hard non-metallic jewel bearing material which comprises grouping a plurality of such rods together in parallel relation to one another in multiple layers comprising a plurality of rods, the rods of each successive layer being arranged so as to nest between the rods of the preceding layer to provide a compact bundle; binding said rods together with a suitable binding material distributed between adjoining rods from end to end thereof so that each rod is bound to its neighbors the full length thereof to form an integrated multi-layered bundle; and cutting a thin slice from said integrated bundle transversely of said rods, said slice comprising a plurality of thin roundels embedded firmly in a matrix of said binding material.

MALCOLM H. BARNES.

REFERENCES CITED

The following references are of record in the file of this patent:

UNITED STATES PATENTS

| Number | Name | Date |
| --- | --- | --- |
| 450,507 | Dalot | Apr. 14, 1891 |
| 1,349,955 | Harwood | Aug. 17, 1920 |
| 2,308,703 | McCain | Jan. 19, 1943 |
| 2,328,302 | Simison | Aug. 31, 1943 |
| 2,340,553 | Obear et al. | Feb. 1, 1944 |
| 2,436,819 | Neidorf | Mar. 2, 1948 |